(12) United States Patent
Yamamoto et al.

(10) Patent No.: US 7,463,392 B2
(45) Date of Patent: Dec. 9, 2008

(54) IMAGE READER AND IMAGE FORMING APPARATUS

(75) Inventors: Yuichi Yamamoto, Toride (JP); Takeshi Aoyama, Abiko (JP); Haruhisa Oshida, Abiko (JP); Ayumu Murakami, Abiko (JP); Shoko Magata, Toride (JP); Takayuki Suga, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 493 days.

(21) Appl. No.: 11/396,710

(22) Filed: Apr. 4, 2006

(65) Prior Publication Data

US 2006/0227389 A1 Oct. 12, 2006

(30) Foreign Application Priority Data

Apr. 8, 2005 (JP) ............................. 2005-111711

(51) Int. Cl.
H04N 1/04 (2006.01)
(52) U.S. Cl. ........................ 358/496; 358/498; 358/474; 358/497; 358/461; 358/408
(58) Field of Classification Search ................. 358/496, 358/474, 497, 498, 461, 408, 471, 401, 501, 358/505, 296; 399/364, 374, 367; 355/23, 355/24
See application file for complete search history.

(56) References Cited

U.S. PATENT DOCUMENTS

| | | | |
|---|---|---|---|
| 6,323,933 B1 * | 11/2001 | Anzai | 355/23 |
| 6,967,749 B2 * | 11/2005 | Chen | 358/406 |
| 7,027,194 B2 * | 4/2006 | Kanda | 358/496 |
| 2002/0030321 A1 | 3/2002 | Sugiyama et al. | 271/226 |
| 2004/0021913 A1 | 2/2004 | Aoyama et al. | 358/474 |
| 2004/0066544 A1 | 4/2004 | Suga et al. | 358/509 |
| 2004/0105133 A1 | 6/2004 | Murakami | 358/474 |
| 2006/0139700 A1 | 6/2006 | Murakami et al. | 358/474 |
| 2006/0197997 A1 | 9/2006 | Oshida et al. | 358/498 |
| 2006/0279803 A1 * | 12/2006 | Wilsher et al. | 358/474 |
| 2007/0188825 A1 | 8/2007 | Suga | 358/474 |

FOREIGN PATENT DOCUMENTS

| | | |
|---|---|---|
| JP | 2004-166145 | 3/1994 |
| JP | 2001-354328 | 12/2001 |
| JP | 2002-120956 | 4/2002 |
| JP | 06-062245 | 6/2004 |

* cited by examiner

*Primary Examiner*—Cheukfan Lee
(74) *Attorney, Agent, or Firm*—Fitzpatrick, Cella, Harper & Scinto

(57) ABSTRACT

Provided is an image reader including: a first reading device for reading an image on one side of a document moving on a transparent glass plate; a second reading device as a movable reading device, for reading one of an image on another side of the document moving on the transparent glass plate and an image on another side of the document remaining stationary on the transparent glass plate; and a show-through preventing member for preventing show-through of the document at a first position opposed to the first reading device, characterized in that the show-through preventing member is provided movably from the first position opposed to the first reading device to a second position in which reading of an image by the second reading device is prevented from being hindered.

6 Claims, 6 Drawing Sheets

IMAGE READER AND IMAGE FORMING APPARATUS

BACKGROUND OF THE INVENTION

1. Field of the Invention

The present invention relates to an image reader capable of reading images on both sides of a document and an image forming apparatus having the image reader.

2. Related Background Art

Conventionally, an image reader such as a scanner and an image reader provided in a copying machine, a facsimile machine, or the like are each equipped with a document feeder for continuously feeding documents. As this document feeder, there is proposed a document feeder having functions of separating documents laid on a table from one another, feeding the documents one by one, conveying the documents to an image reading portion, and besides, reversing the documents, and the like, as in the case of the invention disclosed in, for example, Japanese Patent Application Laid-open No. 2001-354328.

Various methods of optically reading image information on a document have been proposed in image readers. These methods are broadly classified into two methods. According to one of the methods (hereinafter referred to as fixed-reading), a document is laid on a platen, and image information on the document is read while moving a reading device. According to the other method (hereinafter referred to as flow-reading), a reading device is fixed on a platen at a predetermined location thereof, and image information on a document is read while conveying the document.

In recent years, the image readers often adopt the above-mentioned flow-reading method for reasons of enhanced productivity (an increased processable quantity within a certain period of time) and the like. For instance, an image reader capable of performing fixed-reading is arranged to perform a function of the above-mentioned flow-reading. This image reader is provided with. a platen for flow-reading (a flow-reading range) as well as a platen for having a document laid thereon for fixed-reading (a fixed-reading range).

In addition, with a view to achieving further enhancement of productivity, there is also an image reader adopting a method of performing flow-reading of images on a front side and a reverse side of a document simultaneously by using two reading devices, as in the case of the invention disclosed in, for example, Japanese Patent Application Laid-open No. 2002-120956. This image reader is equipped not only with a reading device for reading an image on a front side of a document laid on a platen but also with a reading device for reading an image on a reverse side of the document on a document feeder side. Moreover, a show-through preventing member, which is intended to prevent show-through of a document, is provided at a position opposed to the reading device on the document feeder side. The show-through preventing member is provided in parallel with the platen. Similarly, another show-through preventing member is disposed also on a side opposed to the reading device on the other side.

However, the image reader provided with the platen for flow-reading as well as the platen for fixed-reading has a problem in that an increase in size of the image reader corresponding to the flow-reading range is inevitable in comparison with the image reader capable of performing only fixed-reading. In other words, while achieving enhancement of productivity based on flow-reading, this image reader has a problem of an increase in size.

The image reader having the show-through preventing member, which is provided at the position opposed to the reading device on the document feeder side, disposed in parallel with and adjacent to the platen has a problem of an increase in size corresponding to the size of the show-through preventing member. In other words, while achieving further enhancement of productivity based on flow-reading, this image reader also has a problem of an increase in size.

SUMMARY OF THE INVENTION

It is therefore an object of the present invention to achieve high productivity based on flow-reading while realizing a compact image reader and a compact image forming apparatus.

To achieve the above-mentioned object, an image reader having a representative construction includes: a first reading device for reading an image on one side of a document moving on a transparent glass plate; a second reading device as a movable reading device, for reading one of an image on another side of the document moving on the transparent glass plate and an image on another side of the document remaining stationary on the transparent glass plate; and a show-through preventing member for preventing show-through of the document at a first position opposed to the first reading device, and is characterized in that the show-through preventing member is provided movably from the first position opposed to the first reading device to a second position in which reading of an image by the second reading device is prevented from being hindered.

Other objects and features of the present invention will become apparent from the following description and the drawings.

DESCRIPTION OF THE PREFERRED EMBODIMENT

A preferred embodiment of the present invention will be illustrated hereinafter in detail with reference to the drawings. In the following embodiment of the present invention, an image forming apparatus having an image reader capable of reading images on both sides of a document will be illustrated as an example. Furthermore, a copying machine will be illustrated as an example of the image forming apparatus.

Figure 1:
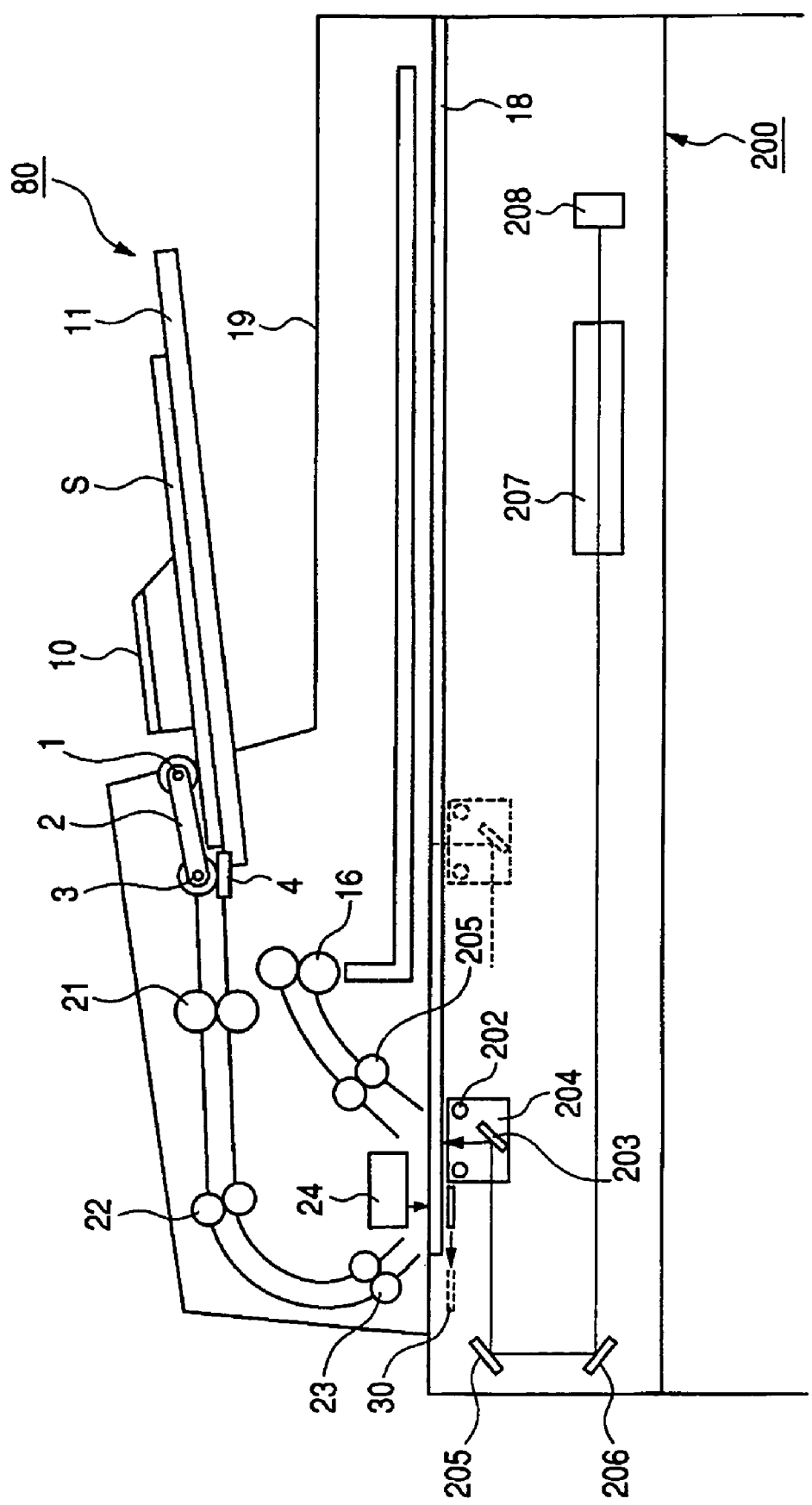
FIG. 1 is a sectional view of an image reader according to an embodiment of the present invention.
Figure 2:
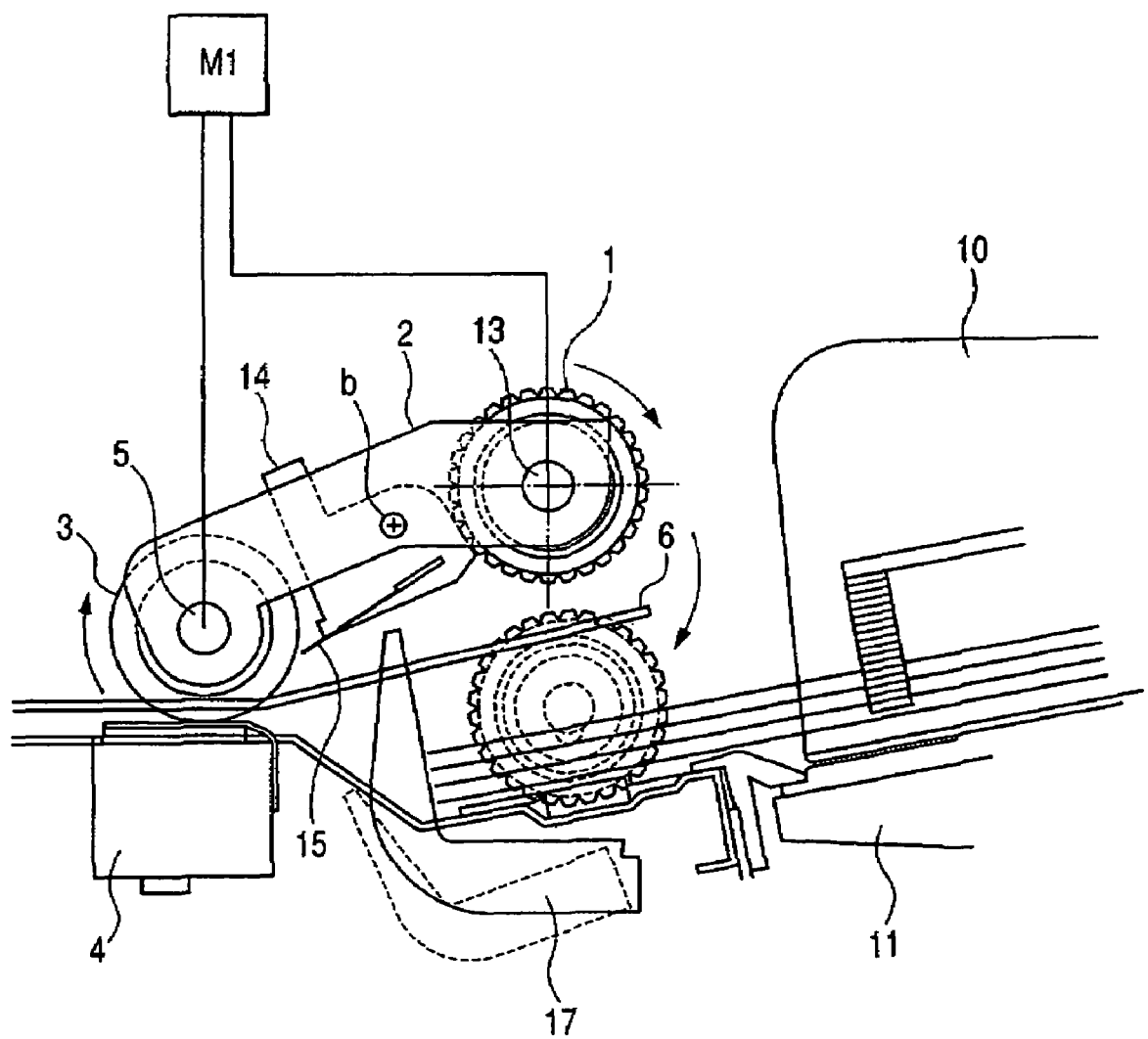
FIG. 2 is a sectional view of a feed portion and a separation portion of a document feeder.
Figure 3:
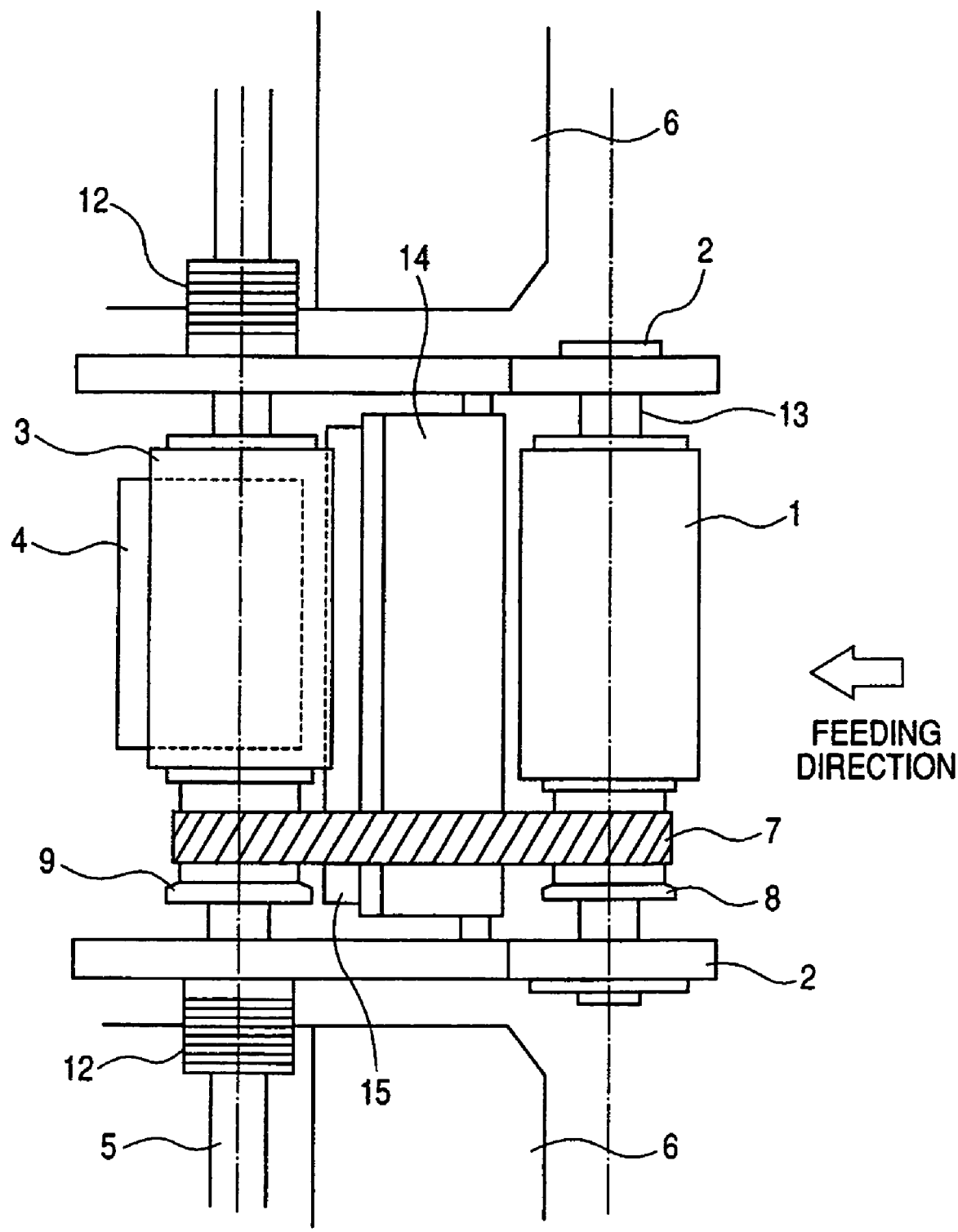
FIG. 3 is a plan view of the feed portion and the separation portion.
Figure 4:
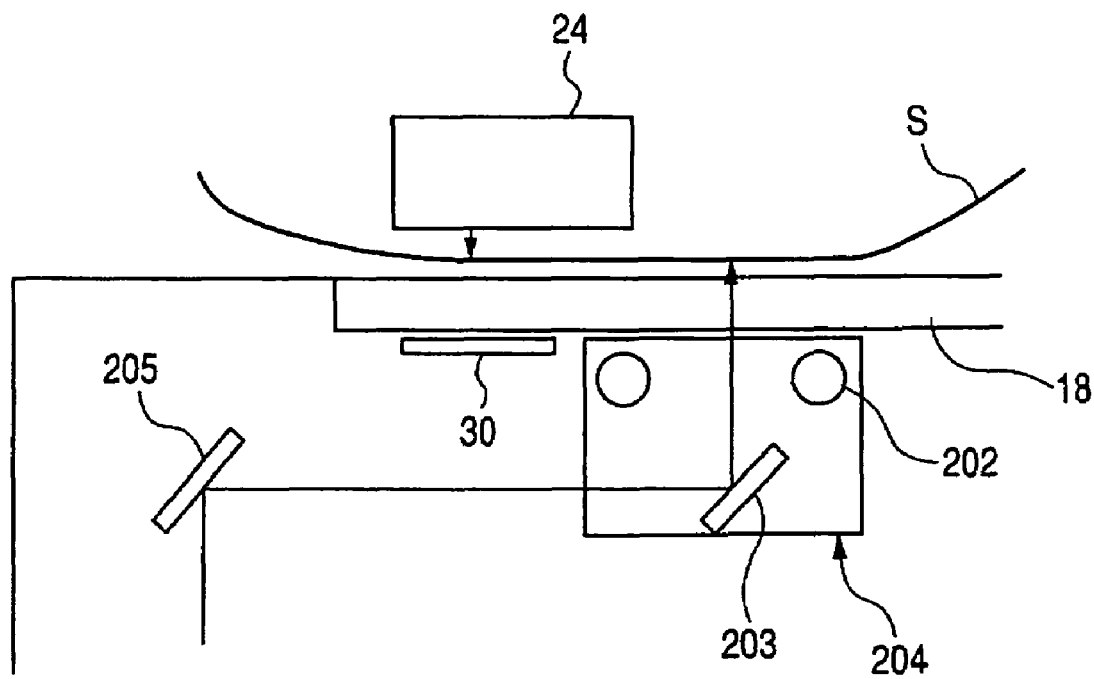
FIG. 4 is a sectional view showing movements of a protrudable/retractable show-through preventing member according to the embodiment of the present invention.
Figure 5:
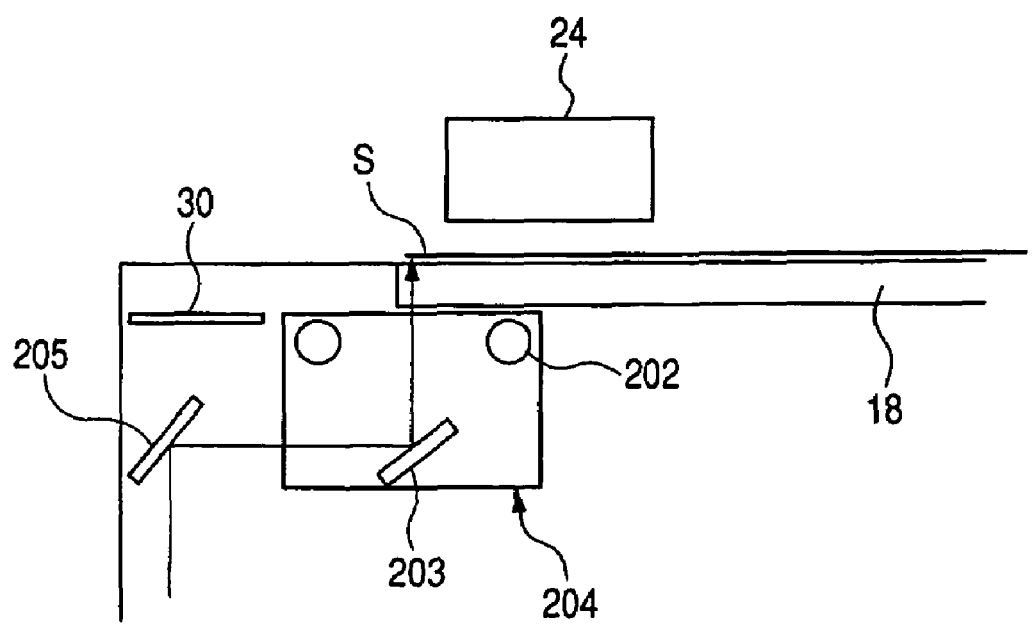
FIG. 5 is a sectional view showing movements of the protrudable/retractable show-through preventing member according to the embodiment of the present invention.
Figure 6:
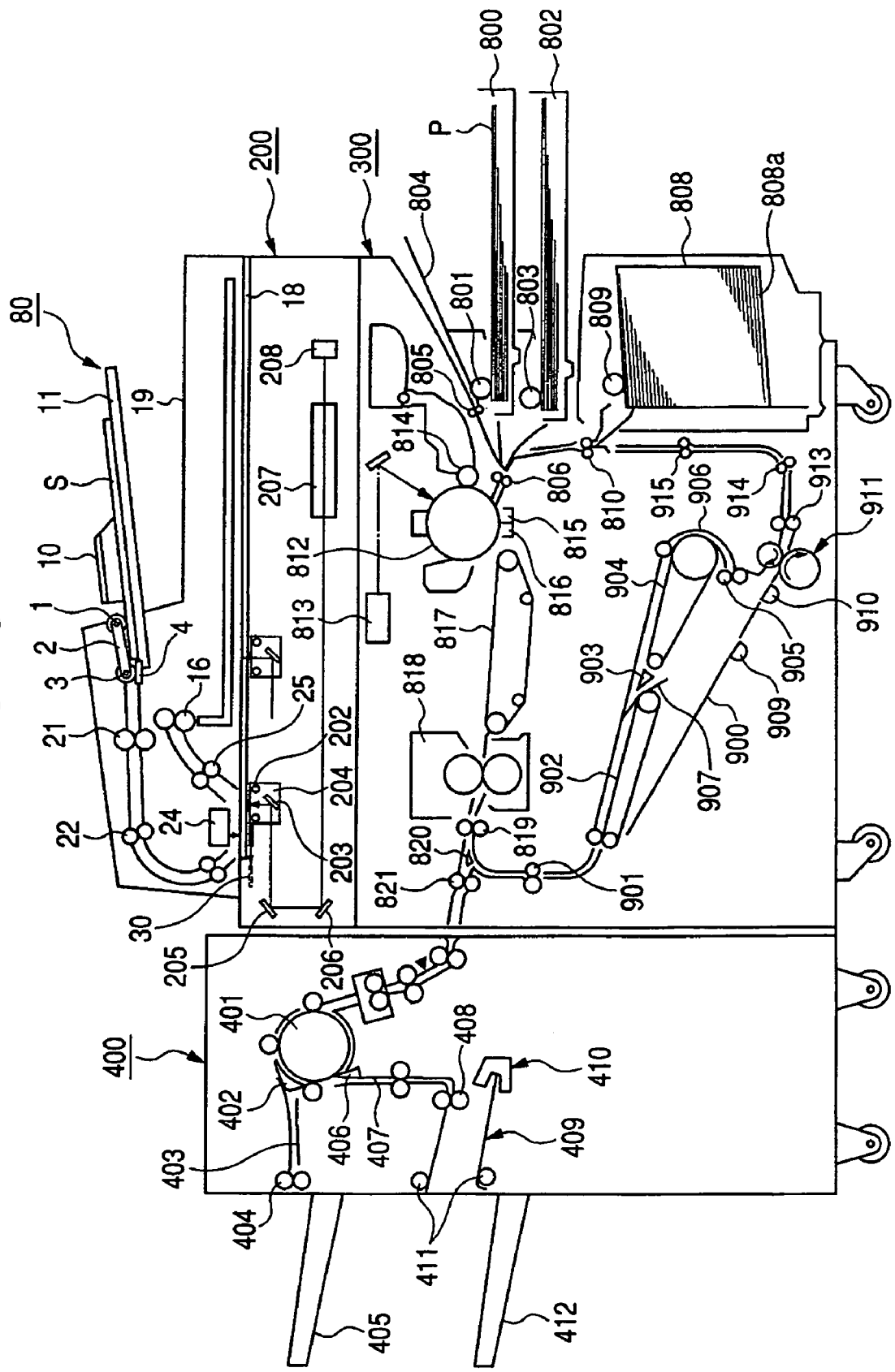
FIG. 6 is a general constructional view of an image forming apparatus according to the embodiment of the present invention.

An image forming apparatus having an image reader according to the embodiment of the present invention will be described. FIG. 1 is a sectional view of the image reader according to the embodiment of the present invention. FIG. 2 is a sectional view of a feed portion and a separation portion of a document feeder. FIG. 3 is a plan view of the feed portion and the separation portion. FIGS. 4 and 5 are sectional views each showing movements of a protrudable/retractable show-through preventing member according to the embodiment of the present invention. FIG. 6 is a general constructional view of an image forming apparatus according to the embodiment of the present invention.

(Image Forming Apparatus)

First of all, a general construction of the image forming apparatus, will be described with reference to FIG. 6. A copying machine main body as the image forming apparatus is composed of an image input portion 200 and an image output portion 300. The image input portion 200, which constitutes the image reader, is equipped in an upper portion thereof with an ADF 80 serving as a document feeder. The image output portion 300, which serves as an image forming device, is equipped laterally thereof with a sheet processor 400. The image input portion 200 and the ADF 80 will be described later in detail as the image reader and the document feeder, respectively.

In order to feed a sheet as a recording material to the image output portion 300, the image output portion 300 is equipped with an upper cassette 800, a lower cassette 802, a manual feed guide 804, and a sheet deck 808. Sheets stored in the upper cassette 800 and the lower cassette 802 are separated from one another and fed one by one by feed rollers 801 and 803 and separation claws, respectively, and then guided to a resist roller 806. Sheets stacked on the manual feed guide 804 are also guided to the resist roller 806 one by one via a pair of feed rollers 805. The sheet deck 808 is equipped therein with an intermediate plate 808a for being raised and lowered by a motor or the like. Sheets stacked for storage on the intermediate plate 808a are separated from one another and fed one by one by a feed roller 809 and a separation claw, and then guided to the resist roller 806 via a transport roller 810.

For a document read into the image input portion 200, toner images corresponding to a set copy quantity are formed on a photosensitive drum 812. One of sheets corresponding to the copy quantity is fed from one of the upper cassette 800, the lower cassette 802, and the like every time a toner image is formed on the photosensitive drum 812. The resist roller 806 is aligned with the photosensitive drum 812 to convey the sheets to an image forming portion.

The photosensitive drum 812 is equipped therearound with an optical system 813, a developing device 814, a transfer charger 815, and a separation charger 816, thereby constituting the image forming portion. By irradiating a surface of the photosensitive drum 812, which has been uniformly electrified, with laser beams from the optical system 813, an electrostatic latent image is formed. A toner image is then formed on the photosensitive drum 812, on which the electrostatic latent image is formed, by the developing device 814. The toner image formed on the photosensitive drum 812 is transferred onto a sheet by the transfer charger 815. The sheet onto which the toner image has been transferred is separated from the photosensitive drum 812 by the separation charger 816.

The sheet onto which the toner image has been transferred is sent to a fixer 818 by a conveying belt 817, so the toner image is fixed onto the sheet through heat and application of a pressure. The sheet that has passed through the fixer 818 is guided to a flapper 820 by a transport roller 819, and sent to an intermediate tray 900 or discharged to the sheet processor 400 by a discharge roller 821.

The intermediate tray 900 is provided to re-feed a sheet. A sheet on which an image has once been formed is stacked on the intermediate tray 900 in forming another image on the other side of the sheet as well (double-sided recording) or forming superimposed images on one side of the sheet (multiple recording). The intermediate tray 900 is equipped with a transport roller 901, a conveying belt 902, a flapper 903, a conveying belt 904, and a transport roller 905. In the case of double-sided recording, the sheet is guided to the intermediate tray 900 through a path 906. In the case of multiple recording, a document is guided to the intermediate tray 900 through a path 907.

Sheets laid on the intermediate tray 900 are separated one by one from below and re-fed through operations of auxiliary rollers 909 and 910 and a pair of normal/reverse separation rollers 911. The sheets that have been re-fed are guided to the image forming portion via transport rollers 913, 914, and 915, the transport roller 810, and the resist roller 806. The sheets on which an image has been formed in the image forming portion are discharged in the same manner as described above.

For one document read into the image input portion 200, sheets corresponding to a set copy quantity, on which an image has once been formed, are stacked on the intermediate tray 900. After that, the document is reversed in the ADF 80, image information on the other side of the document is read, and an image corresponding to the read image information is formed on the sheets which are re-fed from the intermediate tray 900.

A sheet on which an image has been formed, which has been discharged from the copying machine main body, is discharged to the sheet processor 400 (which is also referred to as finisher). When the sheet processor 400 is in a non-sort mode, the sheet is discharged to a sample tray 405 by a discharge roller 404 via a buffer roller 401, a flapper 402, and a non-sort mode path 403 to be stacked on the sample tray 405. When the sheet processor 400 is in a sort mode, the sheet is discharged onto a processing tray 409 by a discharge roller 408 via the buffer roller 401, a flapper 406, and a sort mode path 407 to be temporarily stacked on the processing tray 409. A bundle of sheets on the processing tray 409 is aligned at both ends thereof in a direction crossing a sheet conveying direction, by an alignment member (not shown). In addition, according to need, the bundle of the sheets is stapled at a rear end thereof by a stapler 410. After that, the bundle of the sheets on the processing tray 409 is discharged onto a stack tray 412 by a pair of bundle discharge rollers 411 to be stacked on the stack tray 412.

(Image Reader)

Next, the image reader will be described with reference to FIGS. 1 to 5. As described above, the image reader is composed of the image input portion 200 and the ADF 80. The ADF 80 is designed to send documents S one by one onto a platen 18 made of transparent glass. The ADF 80, which can be opened to and closed from the image input portion 200, operates to press a document laid on the platen 18. The image input portion 200 optically reads an image on a moving document conveyed by the ADF 80 or on a stationary document laid on the platen 18, subjects the image to photoelectric conversion, and inputs the resultant as image information.

As shown in FIG. 1, the image reader has a contact image sensor 24 as a first reading device for reading an image on one side of a moving document conveyed on the platen 18. The contact image sensor 24, which is fixed at a predetermined position (a position shown in FIG. 1) on the ADF 80 side, reads the image on one side of the moving document conveyed on the platen 18.

The image reader has a second reading device for reading an image on the other side of the document. The second reading device is composed of a movable scanner unit 204 having a lamp 202, a mirror 203, and the like, mirrors 205 and 206, a lens 207, an image sensor 208, and the like. The second reading device is provided on the image input portion 200 side. The second reading device stops the scanner unit 204 at a predetermined position (a position indicated by solid lines in FIG. 1), and then reads the image on the other side of the moving document conveyed on the platen 18 on the scanner unit 204. Also, the second reading device reads an image on the other side of the stationary document laid on the platen 18 while moving the scanner unit 204 along the platen 18.

The image input portion 200 has, at a position of the image input portion 200, which is opposed to the contact image sensor 24, a show-through preventing member 30 for preventing show-through of a document. The show-through preventing member 30 has a black member as a surface thereof to prevent reflection of light. In other words, the show-through preventing member 30 prevents light from penetrating the document from a reverse side of the document, thereby preventing show-through of the document. The show-through preventing member 30 is provided movably from a first position (a position indicated by solid lines in FIG. 1), which is opposed to the contact image sensor 24, to a second position (a position indicated by dotted lines in FIG. 1), in which an image is not hindered from being read through a movement of the scanner unit 204.

In this embodiment, as shown in FIG. 1, the show-through preventing member 30 is provided on the scanner unit 204 side, which is opposed to the contact image sensor 24 via the platen 18.

In reading an image on a moving document, as shown in FIG. 4, the show-through preventing member 30 moves to the first position, which is opposed to the contact image sensor 24. In reading an image on a stationary document, as shown in FIG. 5, the show-through preventing member 30 moves to the second position, in which an image is not hindered from being read through a movement of the scanner unit 204.

In addition, the show-through preventing member 30 moves to the first position or the second position in conjunction with a movement of the scanner unit 204. To be more specific, the show-through preventing member 30 according to this embodiment moves from the first position shown in FIG. 4 to the second position shown in FIG. 5 with the aid of a driving device such as a solenoid, in synchronization with a movement of the scanner unit 204 to a reading start position (a left end of the platen 18 shown in FIG. 5). The show-through preventing member 30 according to this embodiment, to which a force of a spring is applied, returns from the second position to the first position due to the force of the spring, in conjunction with a return of the scanner unit 204 to a reading position (a position shown in FIG. 4) of the moving document.

The ADF 80 has a feed tray 11 in an upper portion thereof. The documents S on the feed tray 11 are sequentially let out by the feed roller 1, starting with an uppermost one of them. The documents S thus let out are separated from the others one by one and fed by a separation transport roller 3 and a separation pad 4. An image on each of the documents S, which has been separated from the others and fed, is read by one or both of the scanner unit 204 and the contact image sensor 24, when that document S passes on the platen 18 of the image input portion 200. The document S whose image has been read is discharged onto a discharge tray 19 by a discharge roller 16.

As shown in FIG. 2, a document width regulating plate 10 for regulating a width direction of the stacked documents S is provided on the feed tray 11. A sheet stopper 17 is provided downstream of the feed tray 11. The feed roller 1, which can rotate around a shaft 13, is so constructed as to turn around a shaft 5 by an arm 2 to move upward and downward with respect to the stacked documents S.

A fixed guide 6 and an oscillating guide 14 are provided across the feed roller 1 and the separation transport roller 3 to guide the documents S from the feed roller 1 to the separation transport roller 3. The oscillating guide 14, which has an elastic member 15 such as Mylar mounted to a downstream tip thereof, can oscillate around a fulcrum b.

As shown in FIG. 3, the feed roller 1 and the separation transport roller 3 are provided with pulleys 8 and 9, respectively. A timing belt 7 is hung around and stretched between the pulleys 8 and 9 so as to transmit a driving force of a motor M1 (see FIG. 2) to the feed roller 1. A spring clutch 12 for urging the arm 2 applies a certain pressure (torque) after the feed roller 1 has arrived on a top surface of a document on the feed tray 11 when the motor M1 rotates normally (the feed roller 1 and the separation transport roller 3 rotate as indicated by arrows, respectively, in FIG. 2; so the arm 2 moves downwards), and performs a locking operation to move the arm 2 upwards when the motor M1 rotates reversely.

As shown in FIG. 1, the document S, which has been separated from the other documents and fed, is corrected in direction by a resist roller 21 so as not to move obliquely, and conveyed in a U-turn manner by transport rollers 22, 23, and 25. Of those transport rollers 22, 23, and 25, an equal speed is set between the transport rollers 23 and 25 around the reading portion, between which the contact image sensor 24 and the scanner unit 204 are interposed, with a view to eliminating a difference in conveying speed of the document S. After the image on the document S has been read, the document S is discharged onto the discharge tray 19 by the discharge roller 16.

(Image Reading Operation)

Next, an image reading operation for reading an image on a document on the platen 18 will be described. First of all, an operation of reading an image on a moving document conveyed on the platen 18 (hereinafter referred to as flow-reading) will be described. Then, an operation of reading an image on a stationary document laid on the platen 18 (hereinafter referred to as fixed-reading) will be described.

(In Performing Flow-Reading)

First of all, the image reading operation in performing flow-reading will be described. In the case of a single-sided flow-reading mode, an image on one side of a moving document conveyed on the platen 18 is read by the scanner unit 204, which is stopped at a reading position (the position indicated by the solid lines in FIG. 1). In the case of a double-sided flow-reading mode, on the other hand, an image on the other side of the moving document conveyed on the platen 18 is read by the contact image sensor 24, which is fixed at a reading position (a position shown in FIG. 1). At the same time, the image on one side of the moving document conveyed on the platen 18 is read by the scanner unit 204, which is stopped at the reading position (the position indicated by the solid lines in FIG. 1). That is, in the case of a double-sided flow-reading mode, images on both sides of a moving document conveyed on the platen 18 are simultaneously read by the contact image sensor 24 and the scanner unit 204.

In the flow-reading mode, as shown in FIG. 4, the show-through preventing member 30 moves to the first position opposed to the contact image sensor 24 due to a force of the spring, and operates to prevent show-through of the document at the first position.

(In Performing Fixed-Reading)

Next, the image reading operation in performing fixed-reading will be described. In the case of a fixed-reading mode, first of all, a user manually lays a document on the platen 18. In order to read an image on the laid document on the assumption that the left end of the platen 18 serves as a reference, the scanner unit 204 then moves to a reading start position shown in FIG. 5, which corresponds to the left end of the platen 18. Then, while moving the scanner unit 204 rightward along the platen 18, an image on the other side of the stationary document laid on the platen 18 is read.

In the fixed-reading mode, the show-through preventing member 30 moves from a first position shown in FIG. 4 to a second position shown in FIG. 5 with the aid of a driving device such as a solenoid, in synchronization with a movement of the scanner unit 204 to the reading start position shown in FIG. 5.

As described above, according to this embodiment, the productivity in performing flow-reading can be enhanced by providing two reading devices (the contact image sensor 24 and the scanner unit 204). At the same time, the show-through preventing member 30 can reliably prevent show-thorough of a moving document conveyed on the platen 18 while reading the document, at the first position. opposed to the contact image sensor 24. Moreover, the show-through preventing member 30 can move from the first position to the second position, in which the scanner unit 204 is not hindered from reading an image. Thus, an image reading range for reading an image on a moving document by using the contact image sensor 24 can be arranged within an image reading range for reading an image on a stationary document by using the scanner unit 204. In other words, the coexistence of the image reading range of the moving document with the image reading range of the stationary document can be ensured. Therefore, there is no need to separately provide a platen for reading an image by using the contact image sensor 24, so the image reader can be reduced in size while achieving high productivity based on flow-reading.

In the foregoing embodiment of the present invention, the show-through preventing member 30 is moved while being held horizontally as shown in FIGS. 4 and 5 as an example of a construction for moving the show-through preventing member 30 from the first position to the second position. However, the present invention is not limited to this construction. For example, as shown in FIGS. 7 and 8, the show-through preventing member 30 may be changed in posture from a horizontal state of extending along the platen 18 to a vertical state of extending along an inner lateral surface of the image reader when moving from the first position to the second position.

Figure 7:
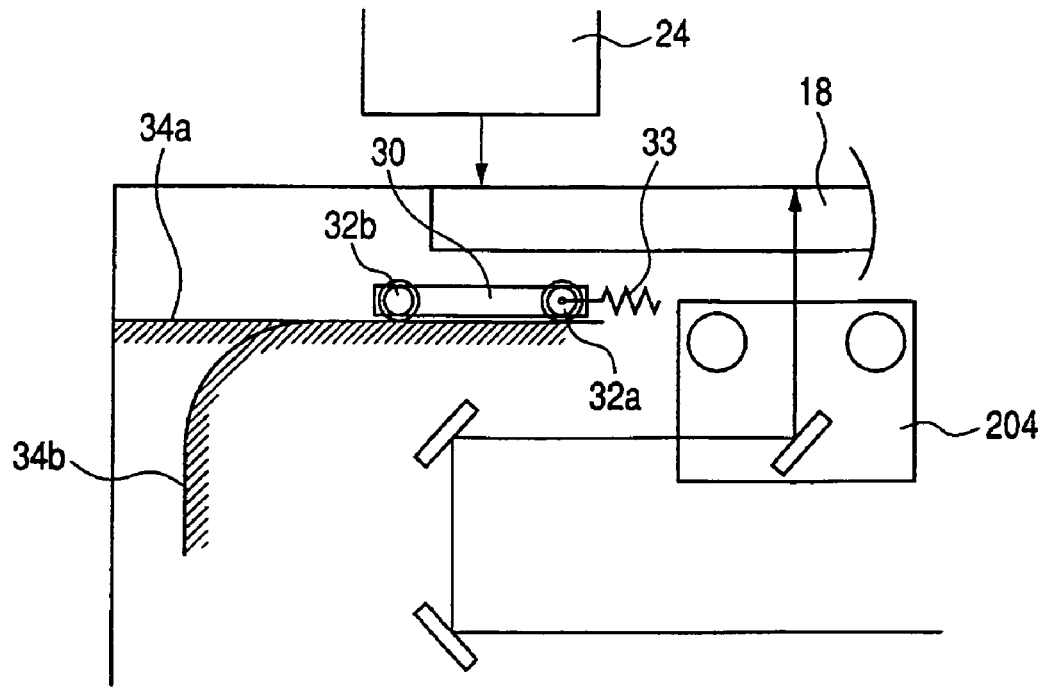
FIG. 7 is a sectional view showing movements of the protrudable/retractable show-through preventing member according to a modification of the embodiment of the present invention.
Figure 8:
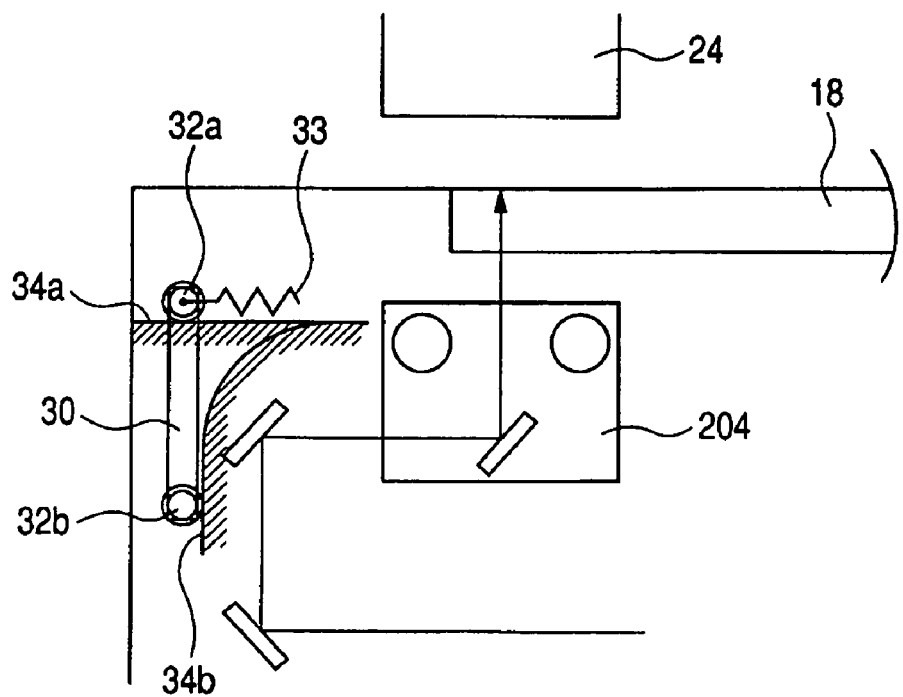
FIG. 8 is a sectional view showing movements of the protrudable/retractable show-through preventing member according to the modification of the embodiment of the present invention.

As shown in FIGS. 7 and 8, the show-through preventing member 30 is provided with rollers 32a and 32b for smoothly moving the show-through preventing member 30 along guides 34a and 34b, respectively. The guide 34a guides the roller 32a of the show-through preventing member 30 in the horizontal direction extending along the platen 18. On the other hand, the guide 34b guides the roller 32b of the show-through preventing member 30 from the horizontal direction extending along the platen 18 to a vertical direction extending along the inner lateral surface of the image reader. In addition, a force of a spring 33 is applied to the show-through preventing member 30 as is the case with the foregoing embodiment of the present invention.

In the flow-reading mode, as shown in FIG. 7, the show-through preventing member 30 moves to a first position opposed to the contact image sensor 24 due to the force of the spring 33, and operates to prevent show-through of a document at the first position.

Then, in the fixed-reading mode, the show-through preventing member 30 moves from the first position shown in FIG. 7 to a second position shown in FIG. 8 against the force of the spring 33, with the aid of a driving device such as a solenoid. During this movement, the roller 32a of the show-through preventing member 30 is guided by the guide 34a in the horizontal direction extending along the platen 18. On the other hand, the roller 32b of the show-through preventing member 30 is guided from the horizontal direction extending along the platen 18 to the vertical direction extending along the inner lateral surface of the image reader by the guide 34b. In moving from the first position to the second position, the show-through preventing member 30 thereby changes in posture from the horizontal state of extending along the platen 18 to the vertical state of extending along the inner lateral surface of the image reader.

With this construction, a further reduction in size of the image reader can be achieved in addition to the same effects as those according to the foregoing embodiment of the present invention.

In the foregoing embodiment of the present invention, the reading device composed of the contact image sensor 24, the scanner unit 204, and the like is illustrated as an example of a reading device for reading an image on a document. However, the reading device according to the present invention is not limited thereto and may be another type of reading device.

In the foregoing embodiment of the present invention, the image forming apparatus is illustrated as an example, which is constructed such that the user manually lays a document on the platen 18 in the fixed-reading mode. However, the present invention is not limited thereto. For example, the present invention is also applicable to an image forming apparatus which is constructed such that a document is automatically laid on the platen 18 by a document feeder.

In the foregoing embodiment of the present invention, the solenoid is illustrated as an example of the driving device for the show-through preventing member 30. However, the driving device is not limited thereto. For instance, another driving device employing a motor or a gear is also acceptable. It is also appropriate to adopt a construction in which the show-through preventing member 30 is integrated with the scanner unit 204 to be moved together therewith.

In the foregoing embodiment of the present invention, the copying machine is illustrated as an example of the image forming apparatus. However, the present invention is not limited thereto. For instance, the present invention is also applicable to an image reader such as a scanner, an image forming apparatus such as a printer or a facsimile machine, or other types of image forming apparatuses such as a compound machine for performing functions of a combination of the aforementioned apparatuses. A similar effect can be achieved by applying the present invention to the above-mentioned image reader or the above-mentioned image forming apparatuses.

This application claims priority from Japanese Patent Application No. 2005-111711 filed on Apr. 8, 2005, which is hereby incorporated by reference herein.

What is claimed is:

1. An image reader comprising:
   a first reading device configured to read an image on one side of a document moving on a transparent glass plate;

a second reading device as a reading device movable along the transparent glass plate and configured to read one of an image on another side of the document moving on the transparent glass plate and an image on another side of the document remaining stationary on the transparent glass plate; and a show-through preventing member configured to prevent show-through of the document at a first position opposed to the first reading device, wherein the show-through preventing member is provided movably, while changed in posture of the show-through preventing device, from the first position opposed to the first reading device to a second position in which reading of an image by the second reading device is not prevented by the show-through preventing member, the show-through preventing member being changed in posture from a horizontal state in which the show-through preventing member extends along the transparent glass plate to a vertical state in which the show-through preventing member extends along an inner lateral surface of the image reader by a movement from the first position to the second position.

2. An image reader according to claim 1, wherein the show-through preventing member is provided on a second reading device side, which is opposed to the first reading device via the transparent glass plate.

3. An image reader according to claim 1, wherein the show-through preventing member moves to the first position opposed to the first reading device in reading the image on the document moving on the transparent glass plate, and moves while changed in posture of the show-through preventing member to the second position, which does not hinder the second reading device from reading an image, in reading the image on the document remaining stationary on the transparent glass plate.

4. An image reader according to claim 1, wherein the show-through preventing member moves to one of the first position and the second position in conjunction with a movement of the second reading device.

5. An image reader according to claim 1, wherein the show-through preventing member is provided on the second reading device to move together with the second reading device.

6. An image forming apparatus comprising:

a first reading device configured to read an image on one side of a document moving on a transparent glass plate;

a second reading device as a reading device movable along the transparent glass plate and configured to read one of an image on another side of the document moving on the transparent glass plate and an image on another side of the document remaining stationary on the transparent glass plate; and a show-through preventing member configured to prevent show-through of the document at a first position opposed to the first reading device, wherein the show-through preventing member is provided movably, while changed in posture of the show-through preventing device, from the first position opposed to the first reading device to a second position in which reading of an image by the second reading device is not prevented by the show-through preventing member, the show-through preventing member being changed in posture from a horizontal state in which the show-through preventing member extends along the transparent glass plate to a vertical state in which the show-through preventing member extends along an inner lateral surface of the image reader by a movement from the first position to the second position.

* * * * *